US012702972B2

(12) United States Patent
Born et al.

(10) Patent No.: US 12,702,972 B2
(45) Date of Patent: Aug. 11, 2026

(54) KNITTING OF NOBLE METAL NETS USING IGNOBLE MATERIALS AT THE EDGE, NOBLE METAL NET PRODUCED IN THIS WAY AND A METHOD FOR USING THE NOBLE METAL NET

(71) Applicant: UMICORE AG & CO. KG, Hanau-Wolfgang (DE)

(72) Inventors: Dirk Born, Langenselbold (DE); Dietmar Koenigs, Gelnhausen (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 445 days.

(21) Appl. No.: 17/634,624

(22) PCT Filed: Aug. 14, 2020

(86) PCT No.: PCT/EP2020/072915

§ 371 (c)(1),
(2) Date: Feb. 11, 2022

(87) PCT Pub. No.: WO2021/032644

PCT Pub. Date: Feb. 25, 2021

(65) Prior Publication Data

US 2022/0323947 A1 Oct. 13, 2022

(30) Foreign Application Priority Data

Aug. 16, 2019 (EP) .................................... 19192033

(51) Int. Cl.
*B01J 23/46* (2006.01)
*B01J 23/42* (2006.01)
(Continued)

(52) U.S. Cl.
CPC ............... *B01J 35/58* (2024.01); *B01J 23/42* (2013.01); *B01J 23/44* (2013.01); *B01J 37/0018* (2013.01);
(Continued)

(58) Field of Classification Search
None
See application file for complete search history.

(56) References Cited

U.S. PATENT DOCUMENTS 5,232,891 A 8/1993 Hörmann
2019/0184386 A1 6/2019 Votsmeier

FOREIGN PATENT DOCUMENTS

DE 40 28 916 C2 5/1984
DE 42 06 199 C1 11/1992
(Continued)

OTHER PUBLICATIONS

Degussa AG, DE 9300150 U1, Machine-generated English translation (Year: 1993).*

(Continued)

*Primary Examiner* — Yun Qian
(74) *Attorney, Agent, or Firm* — Smith, Gambrell & Russell, LLP

(57) ABSTRACT

The present invention relates to a method for producing a non-rectangular noble metal net (5) on flat bed knitting machines, comprising the steps of providing noble metal wire or noble metal alloy wire•providing combustible•yarn•knitting a net (5) using noble metal wire or noble metal alloy wire for the reaction zone (7), wherein•combustible yarn is used for the offcut area (9), which is singed off or otherwise removed after the knitting process.

7 Claims, 3 Drawing Sheets

(51) Int. Cl.
*B01J 23/44* (2006.01)
*B01J 35/58* (2024.01)
*B01J 37/00* (2006.01)
*C01B 21/38* (2006.01)
*D04B 1/14* (2006.01)

(52) U.S. Cl.
CPC ................ *C01B 21/38* (2013.01); *D04B 1/14* (2013.01); *D10B 2101/20* (2013.01); *D10B 2403/0242* (2013.01)

(56) References Cited

FOREIGN PATENT DOCUMENTS

| | | |
|---|---|---|
| DE | 93 00 150 U1 | 3/1993 |
| DE | 4300791 A1 | 7/1994 |
| EP | 0 033 478 A1 | 8/1981 |
| EP | 0 364 153 A1 | 4/1990 |
| EP | 0 364 153 B1 | 3/1992 |

OTHER PUBLICATIONS

Extended European Search Report mailed May 15, 2020 for European Patent Application No. 19192033.9 (7 pages in German with English machine translation).

Translation of the Written Opinion of the International Searching Authority dated Dec. 10, 2020 for International Patent Application No. PCT/EP2020/072915 (8 pages).

International Preliminary Report on Patentability dated Feb. 17, 2022 for International Patent Application No. PCT/EP2020/072915 (9 pages in German with English Translation).

International Search Report for PCT/EP2020/072915, dated Dec. 10, 2020 (6 pgs.).

Written Opinion of the International Searching Authority for PCT/EP2020/072915, dated Dec. 10, 2020 (8 pgs.).

A. Jess, Chemical Technology An Integrated Textbook, Chapter 6.4, 2013, www.wiley-vch.de, (pp. 568-583).

DIN 17470, Electrical Heating Alloys, Oct. 1984 (10 pgs.).

DIN 10095, Heat Resisting Steels and Nickel Alloys, Dec. 2018 (39 pgs.).

G. Schnegelsberg, Handbuch der Faser Theorie und Systematik der Faser Deutscher Fachverlag. Frankfurt a. M 1999 (13 pgs.).

Wikipedia, https://de.wikipedia.org/wiki/Faser, downloaded on Feb. 10, 2022 (20 pgs.).

Examination Report mailed Sep. 28, 2022 for European Patent Application No. 19192033.9 (6 pages in German; 6 Pages English translation).

Examination Report mailed Jan. 28, 2026 for Indian Patent Application No. 202247013319 (9 pages).

* cited by examiner

KNITTING OF NOBLE METAL NETS USING IGNOBLE MATERIALS AT THE EDGE, NOBLE METAL NET PRODUCED IN THIS WAY AND A METHOD FOR USING THE NOBLE METAL NET

Noble metal-catalyzed gas reactions, such as the oxidation of ammonia with atmospheric oxygen in nitric acid production (Ostwald process) or the reaction of ammonia with methane in the presence of oxygen to produce hydrocyanic acid (Andrusssow process), long ago achieved considerable industrial importance; via these, basic chemicals are provided at commercial scale for the chemical industry and for fertilizer production (Andreas Jess, Peter Wasserscheid: Chemical Technology (Wiley-VCH Verlag, Weinheim 2013) Chapter 6.4.)

At the core of such heterogeneously catalyzed gas reactions are noble metal catalysts in the form of gas-permeable spatial structures on or in which the reaction proceeds. Thereby, nets in the form of textiles (DE4028916 C2), interlaced textiles or knitted textiles (EP0364153 B1, DE4206199 C1) made of fine noble metal wires have been implemented for a long time. The noble metal wires consist predominantly of platinum, rhodium or alloys of such metals with other noble or ignoble metals. Thereby, platinum-rhodium alloys with 4 to 12 wt. % rhodium, and platinum-palladium-rhodium alloys with 4 to 12 wt. % palladium and rhodium, are typical.

The catalyst nets are thereby typically arranged in a flow reactor in a plane perpendicular to the flow direction of the gas mixture. Conical arrangements are also known. A plurality of nets are usually expediently arranged one after another and combined into a catalyst net stack.

Downstream platinum capture nets, so-called gettering nets, are typically arranged downstream of the catalyst net stack, which nets serve to recover platinum and rhodium discharged from the catalyst nets in the form of gaseous oxides convective with the reaction gas stream. Such gettering nets usually contain wires made of palladium or palladium alloys, such as palladium-nickel alloys with 2 to 15 wt. % nickel, palladium-copper alloys with 2 to 15 wt. % copper and palladium-nickel-copper alloys with 2 to 15 wt. % nickel and copper. Separating nets made of heat-resistant steel or a heat-conducting alloy, which are intended to prevent the nets from sintering together, are typically located both between the catalyst net stack and the first gettering net, and between the gettering nets. Heat-resistant steels and heat-conducting alloys are known to the person skilled in the art. Corresponding suitable materials are described in DIN EN 17470 and DIN 10095, for example. One suitable material is, for example, the alloy with Material No. 1.4767.

The invention is applicable to catalyst and gettering nets. Noble metal nets are therefore discussed in the following, wherein this term should include catalyst and gettering nets.

Illustration 1 schematically shows the reactor with the net stack installed therein whose function is described below, in an example of catalytic ammonia oxidation:

In the reaction plane (2) of the flow reactor (1), the net stack (3), which consists of a plurality of catalyst nets (4) situated one after another and downstream separation and gettering nets (5), is arranged in a plane perpendicular to the flow direction. This net stack is held in its position by clamping in the net fixing zone (8).

The ammonia-atmospheric oxygen mixture (with an ammonia content of 9-13 vol. %) (6) flows through the net stack (3) at atmospheric or increased pressure, wherein the ignition of the gas mixture takes place in the inlet area and the combustion reaction to form nitrogen monoxide (NO) and water encompasses the entire reaction zone (7):

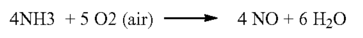

The NO in the outflowing reaction gas mixture reacts as a result with the excess atmospheric oxygen to form $NO_2$:

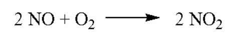

The $NO_2$ in turn reacts in a downstream absorption with water to form nitric acid, which can be is supplied to fertilizer production:

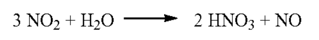

Knitted noble metal nets have a range of advantages in comparison to woven nets, which is why they are preferred today in industrial use. On the one hand, knitting technology offers the possibility of high flexibility with regard to knitting patterns, wire thicknesses that are used and resulting mass per unit area. On the other hand, the knitted noble metal textiles can be produced more economically, since shorter setup times are incurred with knitting technology than with weaving technology. In particular, this involves a significantly reduced noble metal bonding in production. Using flat bed knitting technology, the knitted nets are produced to desired shape and dimensions in individual production, whereas woven nets must be cut from manufactured webs, wherein expensive scrap is incurred. However, the flat bed knitting technique also requires knitting of rectangular shapes, since otherwise the net warps during the knitting process.

The finished knitted catalyst net can thus be divided into three areas:

The reaction zone (7): this is the area of the net that is freely accessible to the reaction gas (6) after installation of the net in the reactor, and serves to catalytically convert the reaction gas or, in the event of gettering nets, to capture the platinum.

The net fixing zone (8): this is the area of the net that is clamped after installation of the net in the reactor for the purpose of net fixing, and is thus not accessible or is accessible only in small part to the reaction gas (6), but must offer sufficient mechanical strength under the reaction conditions and over the service life of the catalyst net.

The offcut zone (9): this is the area of the net that is outside of the net fixing zone and reaction zone, and is required only during the knitting process in order to prevent warping of the net. After the knitting process has ended, the net of the offcut zone is no longer required and can be removed. The noble metal of the offcut zone can be melted again and processed into wire, which, however, increases production costs.

The present invention was therefore based on the object of producing non-rectangular, in particular round, noble metal nets via knitting, and nevertheless to reduce the process-related need for noble metal, and thus the production costs, to the necessary degree.

DETAILED DESCRIPTION

This object is achieved by a method for producing noble metal nets on flat bed knitting machines, consisting of providing noble metal or noble metal alloy wire providing combustible yarn knitting a net using noble metal or noble metal alloy wire for the reaction zone, wherein combustible yarn is used for the offcut area (9), which yarn is singed off or otherwise removed after the knitting process.

Figure 1:
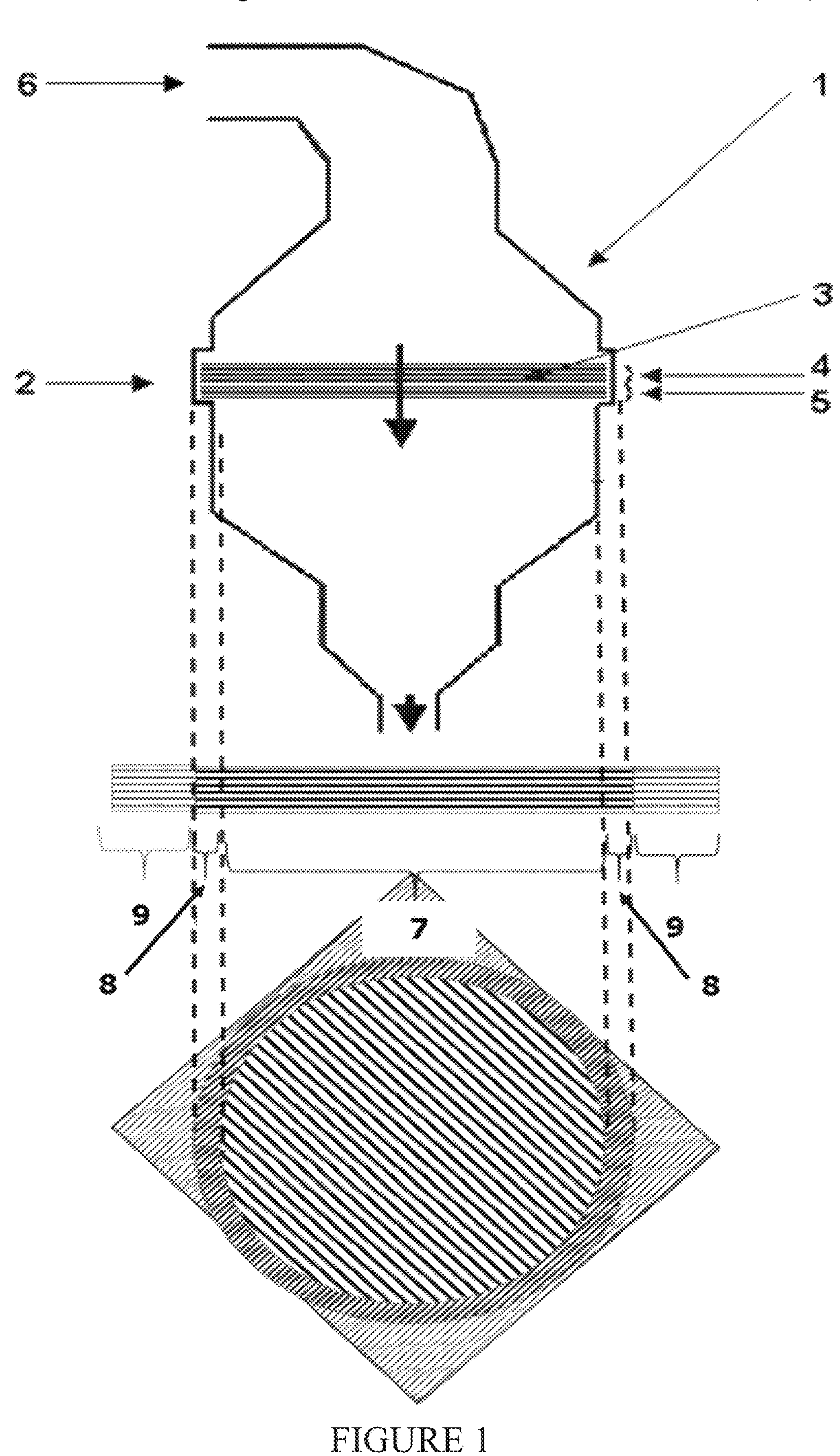
FIG. 1 schematically shows the reactor with the net stack installed therein.
Figure 2:
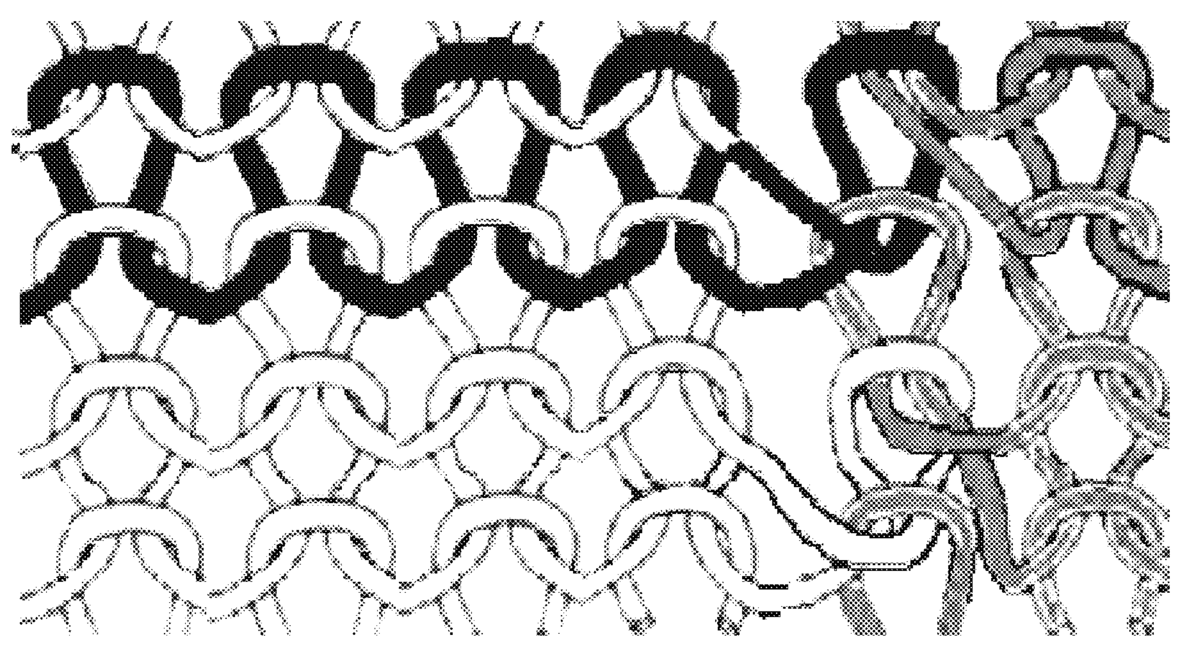
FIG. 2 shows the noble metal net (shown in black-and-white) with the combustible yarn (shown in gray) connected to the noble metal net.
Figure 3:
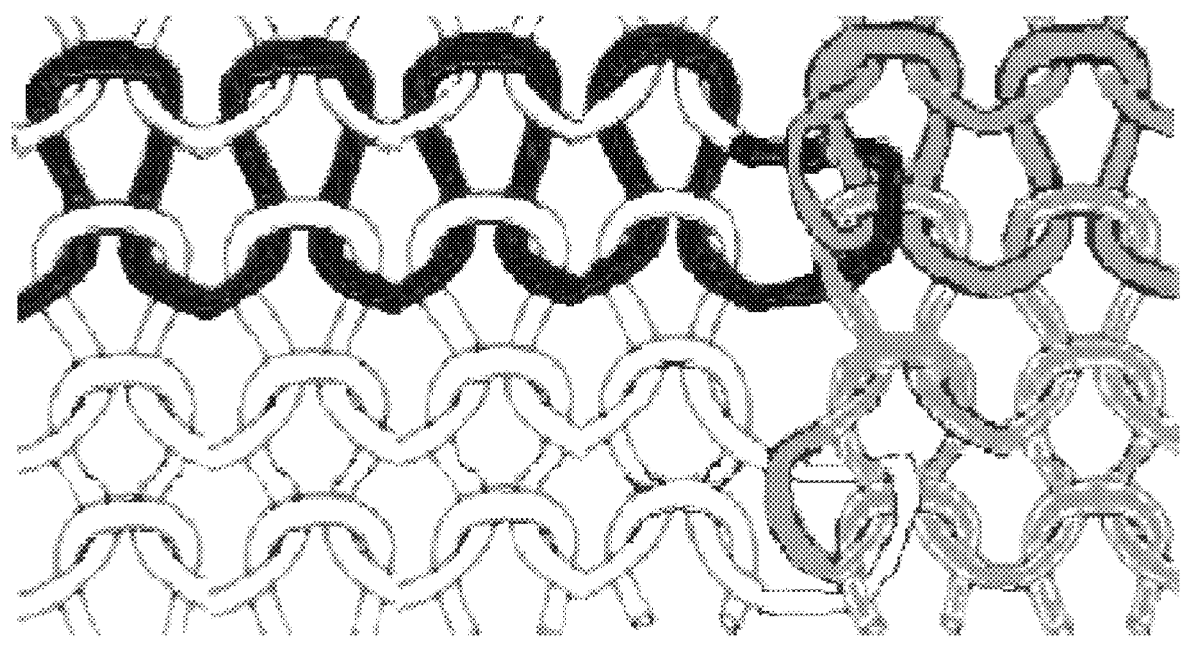
FIG. 3 shows show the noble metal net (shown in black-and-white) with the combustible yarn (shown in gray) connected to the noble metal net in a different manner.
Figure 4:
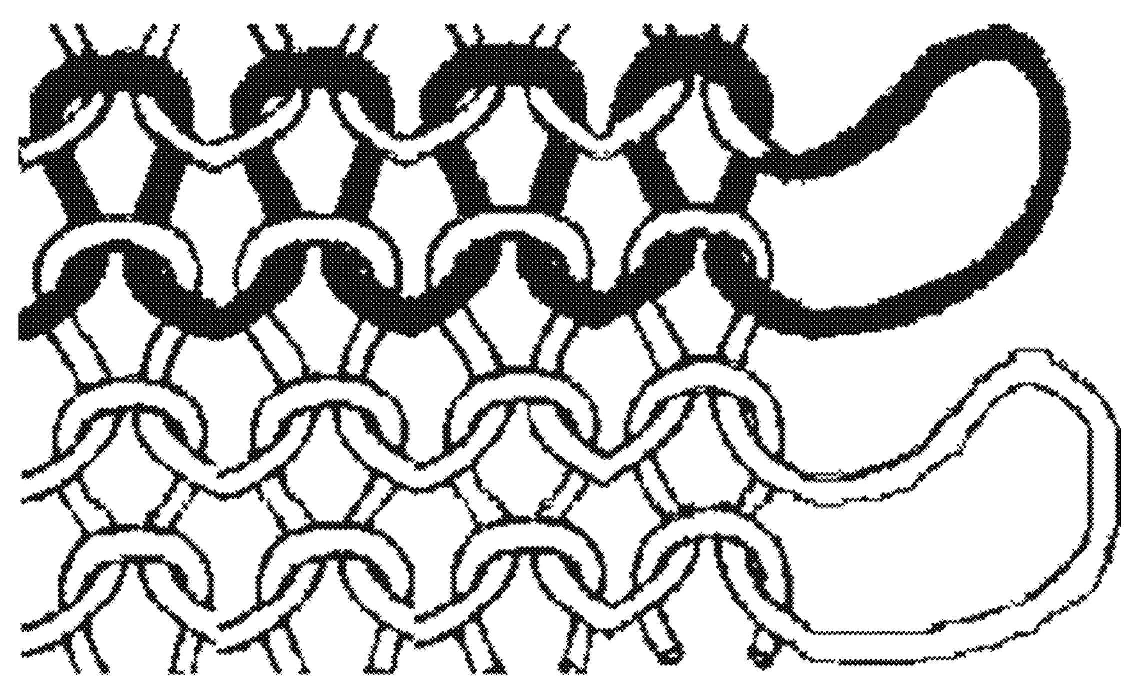
FIG. 4 shows the noble metal net after singeing off the combustible yarn.
Figure 5:
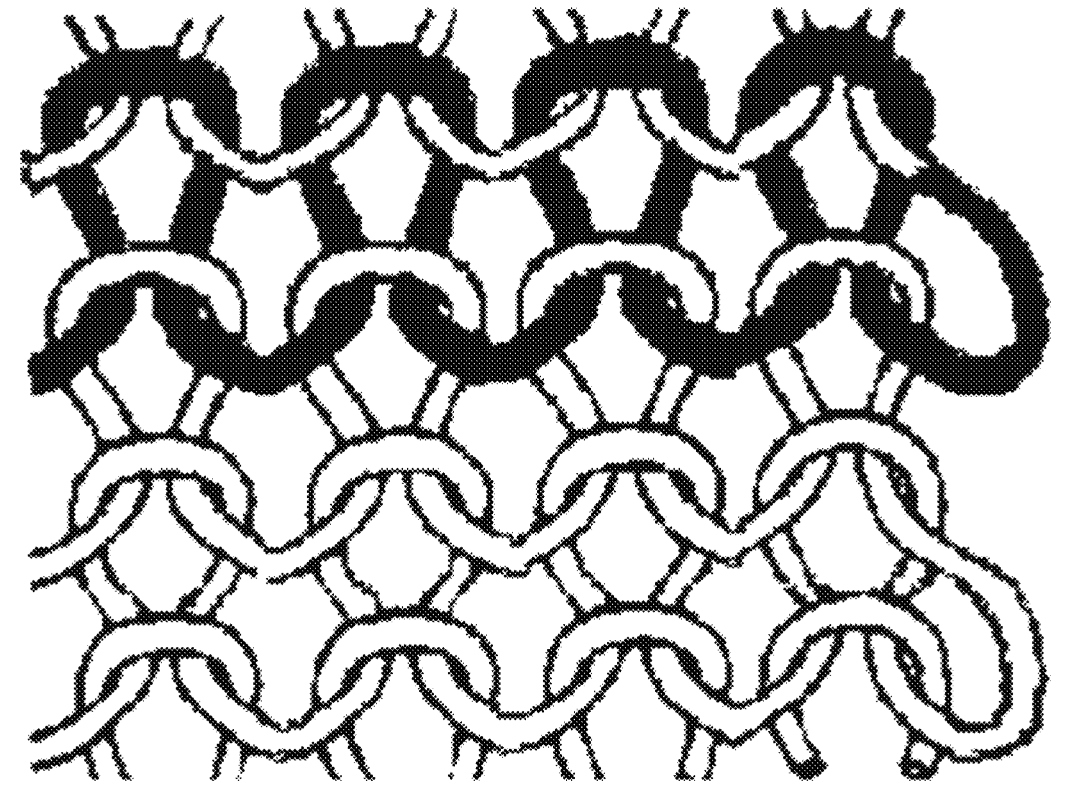
FIG. 5 shows, for comparison, a net corresponding to the prior art in which no corresponding wire hoop is visible at the edge.

The waste of noble metal net, and thus the costs, are thereby markedly reduced, since the noble metal from the offcut needs only be recycled again and processed into wire before it can be resupplied for use. The product according to the invention differs from the prior art only at the edge, and thus outside of the reaction zone, as will be described below. FIG. 2 and FIG. 3 show the noble metal net (shown in black-and-white) with the combustible yarn (shown in gray) connected via the tuck or stitch of the noble metal net. The terms tuck and stitch are known to the person skilled in the art. After singeing off the combustible yarn, the previously connecting tuck or the stitch remain visible a wire hoop at the edge of the noble metal net (FIG. 4). FIG. 5 shows, for comparison, a net corresponding to the prior art in which no corresponding wire hoop is visible at the edge.

In a preferred variant, a platinum or platinum alloy wire is used as a noble metal or noble metal alloy wire. For a preferred variant of this embodiment, a platinum alloy wire with at least 75% platinum is used.

In a further preferred variant, a palladium or palladium alloy wire is used as noble metal or noble metal alloy wire. For a preferred variant of this embodiment, a palladium alloy wire with at least 75% palladium is used.

In one embodiment variant of this method for producing noble metal nets, a combustible yarn selected from the group consisting of chemical fibers, plant fibers and animal fibers is used for the area of the offcut zone (9).

Chemical fibers are thereby to be understood as all fibers that are produced by chemical methods; plant fibers are to be understood as all fibers that are produced based on plants; and animal fibers are to be understood as all fibers that are produced based on animals (https://de.wikipedia.org/wiki/Faser, downloaded on 25 Apr. 2019, and G. Schnegelsberg: Handbuch der Faser—Theorie und Systematik der Faser [Manual of fiber—theory and systematics of fiber]. Deutscher Fachverlag, Frankfurt a. M. (1999)).

In a further embodiment variant of this method for producing noble metal nets, an ignoble metal wire made of heat-resistant steel or a heat-conductive alloy is used outside of the reaction zone (7) for the area of the net fixing zone (8).

Furthermore, this invention further comprises a net that is produced in accordance with the method according to the invention and that consists, in the area of the reaction zone (7) of noble metal or noble metal alloy wire, and in the area of the net fixing zone (8), of wire made of heat-resistant steel or a heat-conductive alloy.

A further part of this invention is a method for the catalytic oxidation of ammonia using a net stack that contains catalyst nets according to the invention and is operated in the presence of oxygen at a temperature in a flow reactor of between 500° C. and 1300° C. and a pressure of between 0.1 MPa and 1.4 MPa.

The invention is described in the following using an example:

EXAMPLE 1

For a reaction zone having a diameter of 100 cm and a net fixing zone of 5 cm in width, a square net with an edge length of 110 cm must be knitted. The total area is 12100 $cm^2$.

Cotton was used for the offcut zone, which could easily be singed off after the knitting process. A reduction of the noble metal usage by 21% thereby results.

Furthermore, the noble metal wire in the net fixing zone was replaced by a heat-conducting alloy, Material No. 1.4767. The resulting reduction of the noble metal usage in comparison to the original square net is 14%.

LEGEND FOR FIG. 1

1 Flow reactor
2 Reaction plane
3 Net stack
4 Catalyst nets
5 Gettering and separating nets
6 Reaction gas
7 Reaction zone
8 Net fixing zone
9 Offcut zone

The invention claimed is:

1. A method for producing a non-rectangular noble metal net, comprising:

providing noble metal or noble metal alloy wire;

providing combustible yarn;

knitting on a flat bed knitting machine a flat bed knitted net using the noble metal or noble metal alloy wire for formation of a reaction zone in the flat bed knitted net and the combustible yarn for formation of an offcut area in the flat bed knitted net, and removing the combustible yarn used in the formation of the offcut area after the knitting process on the flat bed knitting machine to convert the flat bed knitted net from a shape formed on the flat bed knitting machine to a different shape that defines the non-rectangular noble metal net.

2. The method according to claim 1, characterized in that a platinum or platinum alloy wire is used as the noble metal or noble metal alloy wire.

3. The method according to claim 1, characterized in that a palladium or palladium alloy wire is used as noble metal or noble metal alloy wire.

4. The method according to claim 1, characterized in that the combustible yarn used in the formation of the offcut area is selected from the group consisting of chemical fibers, plant fibers and animal fibers.

5. The method according to claim 1, wherein knitting the flat bed knitted net further comprises formation of a net fixing zone which is formed of ignoble metal wire made of heat-resistant steel or a heat-conducting alloy, and wherein the flat bed knitted net has the net fixing zone located between the reaction zone and the offcut area.

6. The method according to claim 1, wherein the reaction zone is free of combustible yarn during the knitting process.

7. The method according to claim 1, wherein an exterior region of the offcut area is free of non-combustible wires during the knitting process.

* * * * *